T. J. Steffe.
Horse Rake.
No. 3561. Reissued. July 20, 1869.
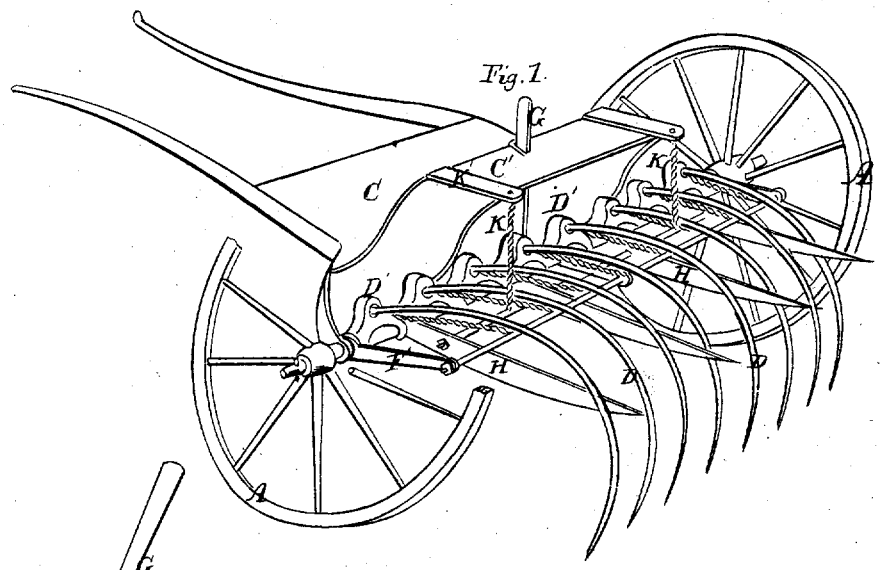
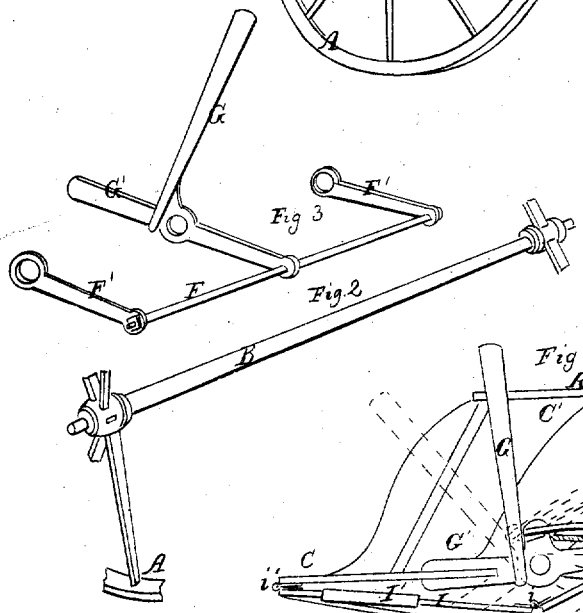
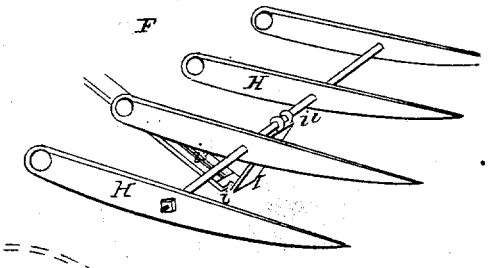
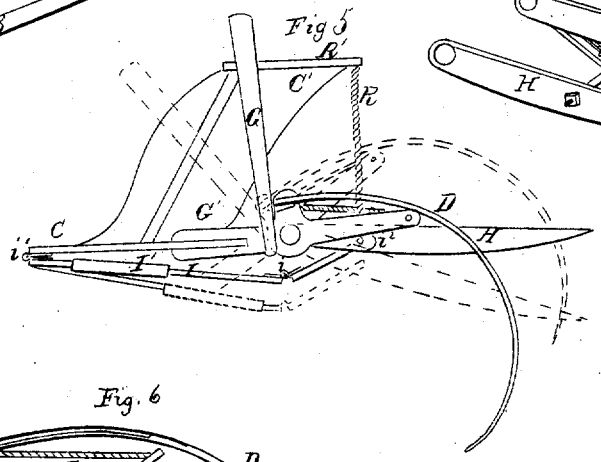
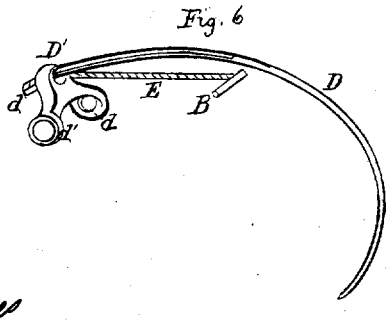
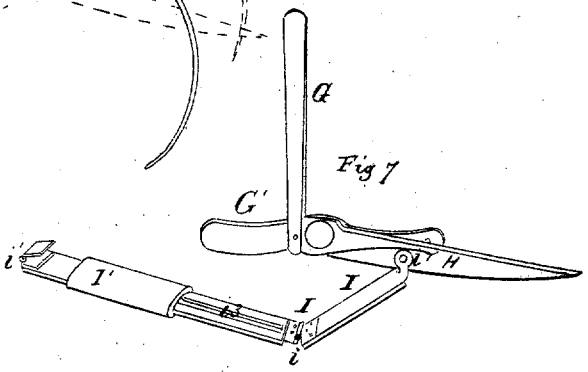
Witnesses
[illegible]
[illegible]
A. R. Reese
by his attorney
[illegible]

United States Patent Office.

ADAM R. REESE, OF PHILLIPSBURG, NEW JERSEY, ASSIGNEE OF THEODORE J. STEFFE.

*Letters Patent No.* 25,535, *dated September* 20, 1859; *reissue No.* 3,561, *dated July* 20, 1869.

IMPROVEMENT IN HORSE-RAKES.

The Schedule referred to in these Letters Patent and making part of the same.

*To all whom it may concern:*

Be it known that THEODORE J. STEFFE, of the city and county of Lancaster, in the State of Pennsylvania, did invent certain new and useful Improvements in the Construction of Horse Hay-Rakes, of which the following is a full, clear, and exact description, reference being had to the accompanying drawing, in which—

Figure 1 is a perspective view of the rake, with part of one wheel broken away;

Figure 2 represents the axle;

Figure 3 shows the devices for lifting the teeth;

Figure 4 shows the cleaners, the method of connecting them with each other, and the brace used for depressing them;

Figure 5 illustrates the manner of operating both teeth and cleaners, showing them in two positions, in black and red lines;

Figure 6 is one of the oval-eyed tooth-heads or boxes, with a tooth secured in it; and Figure 7 shows, in detail, the means for operating the cleaners.

Similar letters denote similar parts in all the figures.

The invention relates to that class of rakes in which wire teeth are hinged, and supported against backward strain, in metallic boxes located above the axle, both teeth and cleaners being vibrated simultaneously in opposite directions by a single movement of a hand-lever.

The invention consists of—

First, supporting the teeth against backward strain by means of a device so constructed that it will admit of the teeth being lengthened or shortened between the gathering-point and the point at which they are secured to the rake. Thus, by shortening them, they are stiffened and better supported for raking heavy material, as, for instance, corn-stubble, while their elasticity may be increased by lengthening them, so as to glean wheat or similar stubble without disturbing too much the young clover and grasses.

Second, in securing the metallic teeth in proper place by means of a key.

Third, in supporting the teeth against backward strain by means of the device through which pressure is applied to hold them in their place.

Fourth, in making the teeth more easily removable; and

Fifth, in certain new combinations and arrangements of parts, as hereinafter explained.

In the drawings—

A A are the wheels.

B, the axle.

C, the body or platform, an elevated portion, C′, of which serves as a seat for the driver.

D D are the teeth, made in the usual form.

D′ are metallic heads or boxes, provided with ears or flanges, *d*, encircling the axle B.

These heads are further provided with oval or elongated perforations, $d^1$, in which the teeth D are confined by means of keys *d*.

Each of these keys has a hole through its smaller or inner end.

To this end is attached one end of the spiral spring E; the other end of said spring being connected with a cross-bar or rod, F, which passes underneath the teeth, and is supported as each end by links, F′, pivoted upon axle B, for a purpose which will be hereafter explained.

G is a bent hand-lever, pivoted upon axle B, about midway between the wheels.

One end of this lever is connected with rod F, while the upright arm extends upward through a slot in platform C, and rests in a notch in seat C′, as shown in fig. 1.

G′ is a heel-extension of said lever, the use of which will soon be explained.

H H are cleaners, each pivoted upon axle B, and all connected with jointed link I, by means of rod H′.

The link I is composed of two parts hinged together at *i*, hinged to the under side of the platform C at $i^1$, and connected with rod H′ at $i^2$.

Said link is slotted, as at $i^3$.

I′ is a slide, so constructed that it can be moved back and forth upon link I.

K K are spiral springs, attached at one end to rod H′, and at the other end to brackets K′, on seat C′, and serving to maintain the cleaners in a horizontal position when they are not depressed by the driver.

The operation of the rake is as follows:

As it is drawn over the ground, the teeth are held down by the springs E, while each tooth is free to conform to the surface of the field, or to rise and pass over obstructions.

When it is desired to dump the hay from the rake, the lever G is thrust forward, thus elevating rod F, and swinging up the teeth to such height as may be desired, the heads or boxes D′ turning upon axle B, to allow the necessary vibration of the teeth.

By the same forward movement of lever G, the heel-extension G′ bears upon and forces down the outer end of link I, carrying with it rod H′ and cleaners H H, thus effectually removing any hay which might otherwise cling to the teeth.

This movement of the teeth and cleaners in opposite directions by the one movement of the lever G is clearly shown in black and red, fig. 5.

When, however, it is desired to elevate the teeth without depressing the cleaners, the slide I is removed from over the slot $i^3$, and the heel-extension G′ of lever G passes down through said slot without actuating link I, and, of course, leaving the cleaners suspended in a horizontal position by springs K.

The rods F and H′ are provided at one end with heads, and at the other with burrs or nuts, making them very convenient for taking out, and the manner of securing the teeth by keys or by a pressure-device, to the independent heads, facilitates their removal without taking said heads off from the axle.

Having thus described the invention of THEODORE J. STEFFE,

What is claimed as new, and sought to be secured by Letters Patent, is—

1. Supporting metallic teeth in a horse hay-rake, against backward strain, by means of a device which will admit of the teeth being lengthened or shortened between the gathering-point and the point of attachment.

2. Supporting metallic teeth in a horse hay-rake, against backward strain, by means of a device through which pressure is applied to the teeth.

3. In combination with a device by which a metallic tooth in a horse hay-rake is supported against backward strain, a spring to hold the tooth to the ground.

4. The combination of the metallic teeth with metallic boxes and key, to support the teeth against their backward strain.

5. In combination with metallic teeth, a key to keep the tooth in its proper place.

6. Attaching the metallic teeth of a horse-rake to metallic boxes or heads supported upon the axle of the rake in such manner that they (the teeth) are free to vibrate vertically, and can be removed without taking the heads or boxes from the axles.

ADAM R. REESE.

Witnesses:

JOHN S. BACH,
T. S. DALTON.